United States Patent [19]
Liu

[11] Patent Number: 6,088,385
[45] Date of Patent: Jul. 11, 2000

[54] FLEXIBLE AND SCALABLE RATE ADSL TRANSCEIVER AND SYSTEM

[75] Inventor: Ming-Kang Liu, Cupertino, Calif.

[73] Assignee: Integrated Telecom Express, Santa Clara, Calif.

[21] Appl. No.: 09/026,030

[22] Filed: Feb. 19, 1998

Related U.S. Application Data

[63] Continuation-in-part of application No. 08/884,895, Jun. 30, 1997, which is a continuation-in-part of application No. 08/884,956, Jun. 30, 1997, which is a continuation-in-part of application No. 08/884,957, Jun. 30, 1997, which is a continuation-in-part of application No. 08/884,958, Jun. 30, 1997, which is a continuation-in-part of application No. 08/884,959, Jun. 30, 1997, which is a continuation-in-part of application No. 08/884,979, Jun. 30, 1997.

[51] Int. Cl.[7] .................................. H04B 1/38; H04L 5/16
[52] U.S. Cl. ............................................ 375/219; 375/372
[58] Field of Search .................................... 375/219, 220, 375/225, 259, 260, 372, 371; 370/412, 493–495

[56] References Cited

U.S. PATENT DOCUMENTS

| | | | |
|---|---|---|---|
| 4,620,294 | 10/1986 | Leung et al. | 364/900 |
| 4,847,863 | 7/1989 | Watson | 375/8 |
| 5,161,154 | 11/1992 | Diaz | 370/95.1 |
| 5,170,470 | 12/1992 | Pindar | 395/275 |
| 5,222,077 | 6/1993 | Krishnan . | |
| 5,285,474 | 2/1994 | Chow et al. | 375/13 |
| 5,479,447 | 12/1995 | Chow et al. | 375/260 |
| 5,519,731 | 5/1996 | Cioffi | 375/260 |
| 5,524,122 | 6/1996 | Lepitre et al. | 375/222 |
| 5,557,612 | 9/1996 | Bingham | 370/71 |
| 5,596,604 | 1/1997 | Cioffi | 345/260 |
| 5,627,863 | 5/1997 | Aslanis et al. | 375/357 |
| 5,898,744 | 4/1999 | Kimbrow et al. | 375/376 |
| 5,910,970 | 6/1999 | Lu | 375/377 |

FOREIGN PATENT DOCUMENTS 9528773  10/1995  WIPO .

OTHER PUBLICATIONS

Peter S. Chow, et al, "A Practical Discrete Transceiver Loading Algorithm for Data Transmission over Spectrally Shaped Channel," IEEE Transactions on Communications, vol. 43, No. 2/3/4, Feb./Mar./Apr., 1995, pp. 773–775.

Ian Galton and Henrik Jensen, "Delta–Sigma Modulator Based A/D Conversion without Oversampling," IEEE Transactions on Circuits and Systems—II: Analog and Digital Signal Processing, vol. 42, No. 12, Dec. 1995, pp. 773–784.

R. Khoini–Poorfard and D.A. Johns, "Time–Interleaved Oversampling Convertors," Electronics Letters, vol. 29, No. 19, Sep. 16, 1993, pp. 1673–1675.

Pervez M. Aziz, et al, "Multi Band Sigma Delta Analog to Digital Conversion," International Conference on Acoustics, Speech and Signal Processing, pp. 249–252, Apr. 19–22, 1994.

*Primary Examiner*—Chi H. Pham
*Assistant Examiner*—Jean B. Corrielus
*Attorney, Agent, or Firm*—Law &

[57] ABSTRACT

A high speed modem is described that implements a scalable data rate ADSL link. The target data rate of the modem is scaled appropriately relative to a maximum available protocol rate by a factor M based on the signal processing capabilities available for performing DMT modulation and demodulation. An upstream transceiver is informed of the proposed scaling factor during a handshaking procedure, and thereafter the data rate of the channel is then scaled down by sending M copies of the same DMT symbol to the upstream transceiver, which effectively reduces the rate by such factor M. A self-executing calibration routine can be used for determining the appropriate scaling factor for such device, or alternatively, in some contexts a user can configure such scaling factor directly through a suitable interface. The invention can be implemented as a stand-alone unit with a self-contained DSP for performing necessary signal processing, or as a software modem located within a personal computer or similar computing device including portable digital devices such as cell phones, personal digital assistants, etc.

65 Claims, 2 Drawing Sheets

6,088,385

FLEXIBLE AND SCALABLE RATE ADSL TRANSCEIVER AND SYSTEM

CROSS REFERENCE TO RELATED APPLICATIONS

The present application is a continuation-in-part of the following additional applications:

Ser. No. 08/884,895, filed Jun. 30, 1997 for a "Forward Compatible And Expandable High Speed Communications System & Method of Operation";

Ser. No. 08/884,956, filed Jun. 30, 1997 for a "Device Driver For Rate Adaptable Modem With Forward Compatible and Expandable Functionality";

Ser. No. 08/884,957, filed Jun. 30, 1997 for "Software Rate Adaptable Modem with Forward Compatible and Expandable Functionality & Method of Operation";

Ser. No. 08/884,958, filed Jun. 30, 1997 for "Modular Multiplicative Data Rate Modem & Method of Operation";

Ser. No. 08/884,959, filed Jun. 30, 1997 for a "User Controllable Applications Program For Rate Adaptable Modem With Forward Compatible and Expandable Functionality."

Ser. No. 08/884,979, filed Jun. 30, 1997 for a "Rate Adaptable Modem With Forward Compatible and Expandable Functionality & Method of Operation."

The above applications are hereby expressly incorporated by reference.

FIELD OF THE INVENTION

The invention relates generally to an improved high-speed communications system that establishes a data link using only a selectable and scalable portion of the total available bandwidth (potential downstream data transmission) of a channel. In particular, the present invention permits the characteristics (including target data rate) of an ADSL link to be controlled based on the capabilities of the processing power of a host system that is responsible for implementing a software modem. The system is scalable in performance based on the available signal processing power of such processor, and permits a user to increase throughput to the point of achieving full potential of the available channel bandwidth.

BACKGROUND OF THE INVENTION

In the prior applications noted above, it was pointed out that Asymmetric Digital Subscriber Line (ADSL) is becoming more and more and popular for high-speed modem applications. The ANSI T1.413 ADSL standard uses a technology called Discrete Multi-Tone (DMT) that sends data over 255 separate frequency channels, and each 4 kHz frequency channel can be made to provide a bit rate up to the best present day voice band (33.6 kb/s) modems. This results essentially in overall performance that is equivalent to around two hundred V0.34 modems used in parallel on the same line. Because each channel can be configured to a different bit rate according to the channel characteristics, it can be seen that DMT is inherently "rate-adaptive" and extremely flexible for interfacing with different subscriber equipment and line conditions.

A number of problems arise, however, in attempting to implement a full scale ADSL transceiver cost-effectively, especially in a software modem environment where available signal processing power can vary significantly and unpredictably from device to device. For example, a state of the art desktop computer using the latest microprocessor technology may have a potential signal processing capability many times higher than a simple hand-held computing device. The processor within such devices must also tend to a number of additional operating system and application tasks which limits the available computational time for processing DMT received/transmit symbols. Moreover, DMT technology requires advanced analog front end (AFE) devices that can also push current technology limits and imposes both high cost and power consumption. Both of these facts make a full-scale ADSL implementation undesirable for new and contemplated classes of hand-held personal computing devices. Furthermore, requiring a communications device (such as a modem) to fully support the total throughput of a standard such as ADSL may be unnecessary when prospective users of high-speed data links do not need to use all the available bandwidth provided by such standards.

As disclosed in the above prior applications, an ADSL implementation that permits users to throttle or scale the data throughput in a manner they can control, based on their particular application needs, hardware cost budget, etc., is far more efficient and desirable. As such, one approach discussed at length in the above applications for controlling data bandwidth or throughput is to initiate a link in which the transmitting spectrum of the ADSL signal is confined to a particular set of frequencies (or sub-channels) so that the overall data rate can be restricted to a range suitable for the user setting up the channel. By informing an upstream transceiver that only a selected set of sub-channels should be used, and controlling this sub-set, a user can also thereafter scalably increase the data rate through suitable hardware adjustments, including by adding additional AFE stages that permit a larger section of the ADSL signal to be processed. In this manner, the data rate is scaled by processing a larger and larger portion of a regular ADSL signal within a given ADSL symbol period.

The merits of a scalable data rate ADSL transceiver, therefore, are well known. Nevertheless, the above solution may not be optimal for all possible environments, in the sense that it may not be the simplest, most cost-effective, most flexible, etc. It would also be extremely desirable if it were possible to reduce the effective data rate in other controllable ways which are flexible, easily implementable within the ADSL protocol, and which optimize computational loading on available signal processing circuitry. For example, in an ADSL software modem context, it would be extremely useful if the receive and transmit data rates could be controlled entirely by software updates and modifications, rather than by hardware changes. To date, however, this capability does not exist in prior art ADSL modems.

SUMMARY OF THE INVENTION

An object of the present invention therefore is to provide a communications system which is fully compatible with high speed, rate adaptable modulation protocols such as used with ADSL, but which system is nevertheless implementable with simpler digital signal processing circuitry and is thus reduced in cost and complexity;

Another objective of the present invention is to provide a method for scaling down a data transmission rate in a DMT modulated ADSL channel by processing only a limited number of symbols in a DMT signal;

Another objective of the present invention is to provide a high speed communications system having a data throughput that is easily and finely controllable and expandable through software control, so that the performance range of such system can be configured to any fractional percentage of total bandwidth available in a transmission channel, up to and including full bandwidth use of the channel;

These objects and others are accomplished by providing a scalable data rate transceiver which includes a channel interface circuit for receiving an analog data signal from an upstream transceiver through a conventional digital subscriber loop channel. The upstream transceiver negotiates with the transceiver on the value of a data rate scaling factor M. Thereafter, the upstream transceiver transmits M identical copies of an analog data signal, which is sampled by a front end receiving circuit and converted into M identical digital signals. In a preferred embodiment, the analog data signals are DMT symbols representing a number of modulated sub-channels of an ADSL signal. A data buffer is coupled to the front end receiving circuit and is loaded with one of the copies of the M signals. A signal processing circuit (either a dedicated DSP or a host processor accessible to the data buffer through a data channel) then need only process one of the M identical digital signals, which results in a controlled, scaled data rate reduction by such factor M. In a preferred embodiment, therefore, a maximum xDSL data rate R available in a digital subscriber loop is scaled to a rate R/M to reduce computational load and processing requirements of a signal processor used in the signal processing circuit.

In another embodiment, a separate upstream transmit data rate R' is also scaled by a factor M' as well, resulting in a scaled data rate R'/M' and thus providing yet another measure of control over the computation load on a signal processing circuit. The values of M and M' can be independently controlled so as to effectuate a maximum transmit rate, a maximum receive rate, a minimum amount of data computational load on the signal processing circuit, etc. Such values for M and M' are generally based on signal processing capabilities available to the transceiver and can be determined by a calibration routine or determined by a user of a host processing device based on system parameter options presented to the user by an applications program running on the host processing device.

The present invention can be implemented either with a standalone dedicated signal processor in a conventional hardware modem configuration, or, alternatively, as a software modem utilizing the native processing capability of a host processing device for signal processing requirements. In a software modem embodiment, a bus interface circuit is needed for transmitting the digital signals from the data buffer to a host processing device, and for receiving a transmission control signal from the host processing device to cause the upstream transmitter to transmit at a data rate substantially equal to the scaled data rate R/M.

Although the inventions are described below in a preferred embodiment implementing the ADSL standard, it will be apparent to those skilled in the art the present invention would be beneficially used in any high speed rate-adaptable applications.

It should be noted that while some prior art devices also have limited mechanisms for achieving a reduction of nominal or peak transmission speed in a channel, they only activate or implement such mechanisms as a fallback response to a failure in the channel, or because of a transmission rate reduction in the upstream transceiver. Unlike the present invention, such prior art modems, during an initialization process, attempt to establish the highest possible transmission rate achievable by the channel and the upstream transceiver. In other words, any rate reduction imposed by the downstream modem is typically considered an unintended and undesirable side effect of bad channel characteristics and not a desirable and intentional design target as set forth in the present invention. In addition, the data rate reduction in such modems is accomplished primarily by varying the number of bits per baud (hertz) at a fixed frequency, and not by controlling the number of symbols that can be provided in a downstream data transmission.

Similarly, while a fixed 300 baud rate downstream modem can work with an upstream 33 kb/s rate modem this arrangement is also unlike the present invention. This is because, again, the bandwidth reduction in such prior art device is so large that it is considered commercially unusable by today's standards. Furthermore, the smaller bandwidth modem is not compatible with, and does not support, the higher protocols of the higher bandwidth modem, which is also undesirable from an implementation standpoint. Stated another way, unlike the present invention, the lower end modem limitations of prior art system force the data link to be set up using a low level protocol that does not take advantage of the full capabilities of more advanced protocols.

Finally, there is no mechanism for users of either of the prior art systems noted above to expand the functionality of such modems in a controlled, flexible, and modular manner.

The present invention therefore further builds on and complements the approach of our earlier-filed channel rate control applications. In particular, the present invention performs a time domain scaling (rather than a frequency domain scaling) of the ADSL signal in order to scale down the available channel data rate. The computational load of an ADSL system employing the present invention can be scaled by negotiating a scaling factor M with the remote transceiver, based on the processing power available in (or to) the user transceiver. By virtue of the fact that software control (rather than fixed hardware performance constraints) is utilized to configure the scaling factor M, more granular control over the channel data rate can be achieved. In this manner, the scaling factor a user can again achieve a link that is entirely compatible with ADSL protocols, and yet is optimized for the particular computing platform initiating the link. Furthermore, the receive and transmit data rates can be controlled entirely by software updates and modifications, rather than by hardware changes, which is an extremely desirable characteristic from the perspective of the user of such device.

DETAILED DESCRIPTION OF THE INVENTION

Figure 1:
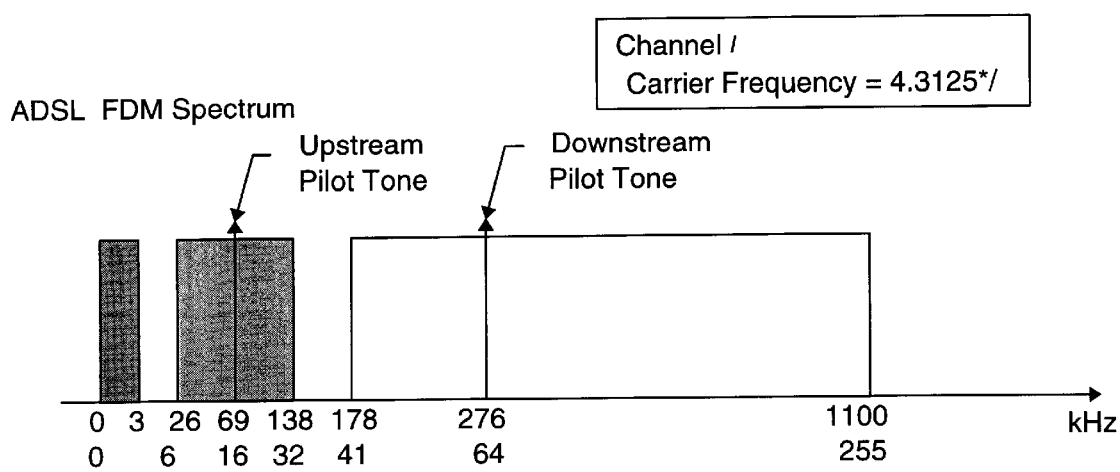
FIG. 1 is a pictorial depiction of the ADSL/DMT bandwidth allocation for upstream and downstream data in a channel based on frequency division multiplexing (FDM) configuration.

According to the T1E1.4 ADSL standards, data bits are grouped and processed every 250 μsec. The number of bits that can be processed over one such time frame is the summation of the bits allocated for each subchannel determined from the previous channel response measurement. For a given number of bits assigned to a certain subchannel, quadrature amplitude modulation (QAM) is used to convert bits to a complex value, which is then modulated by the subchannel carrier at the corresponding frequency. The general circuits used in prior art ADSL systems are well-known in the art, and will not be discussed at length herein except where such structures or procedures have been modified in accordance with the teachings herein.

The full downstream data throughput of a typical prior art ADSL standard transceiver approaches 6 Mbps, which is more than 200 times the speed of conventional analog modem technology. This requirement was imposed since a large part of the initial motivation to implement ADSL was to achieve high speed multimedia communications and video teleconferencing.

Nevertheless, a large number of potential users cannot or do not need to achieve such wide bandwidth capability. For example, most contemporary (and contemplated) hand-held computing devices are not likely to include extremely powerful onboard digital signal processing capability even though such devices are expected to be interfaced to some degree with xDSL links. Other potential users of ADSL (or similar high speed loops), including many who are intending to use such links primarily for Internet access, only need to achieve downstream transmission speeds that are in the hundreds of kilobits per second range. This data rate is in fact achievable using only a fraction of the available bandwidth of ADSL.

By scaling the data rate in a controlled fashion, the present invention permits a data rate limited ADSL link to be effectuated with significantly less expense and complexity than previously possible. At the same time, because the present invention is flexibly upgraded, the proposed implementation of the present invention affords users an easy path to forward and upward expansion of the overall functionality of their system. The present invention adjusts the data rate of an xDSL link by providing two time scaling factors M and M' in the receive and transmit directions respectively. These two factors are determined by estimating available signal processing power of a communications system to represent the fractional capabilities of the particular transceiver in question compared to a nominal full xDSL data rate implementation. After these factors are determined, they are communicated to an upstream transceiver during a handshaking procedure so that any data link established is data rate constrained to match the downstream transceiver's signal processing capability. As the signal processing capability available to the transceiver is enhanced (either through an upgraded dedicated processor or additional computation horsepower provided by a host processor), the scaling factor M and M' can be reduced, resulting in an increase in the data rate for the link.

GENERAL EMBODIMENT OF PRESENT INVENTION

Figure 2:
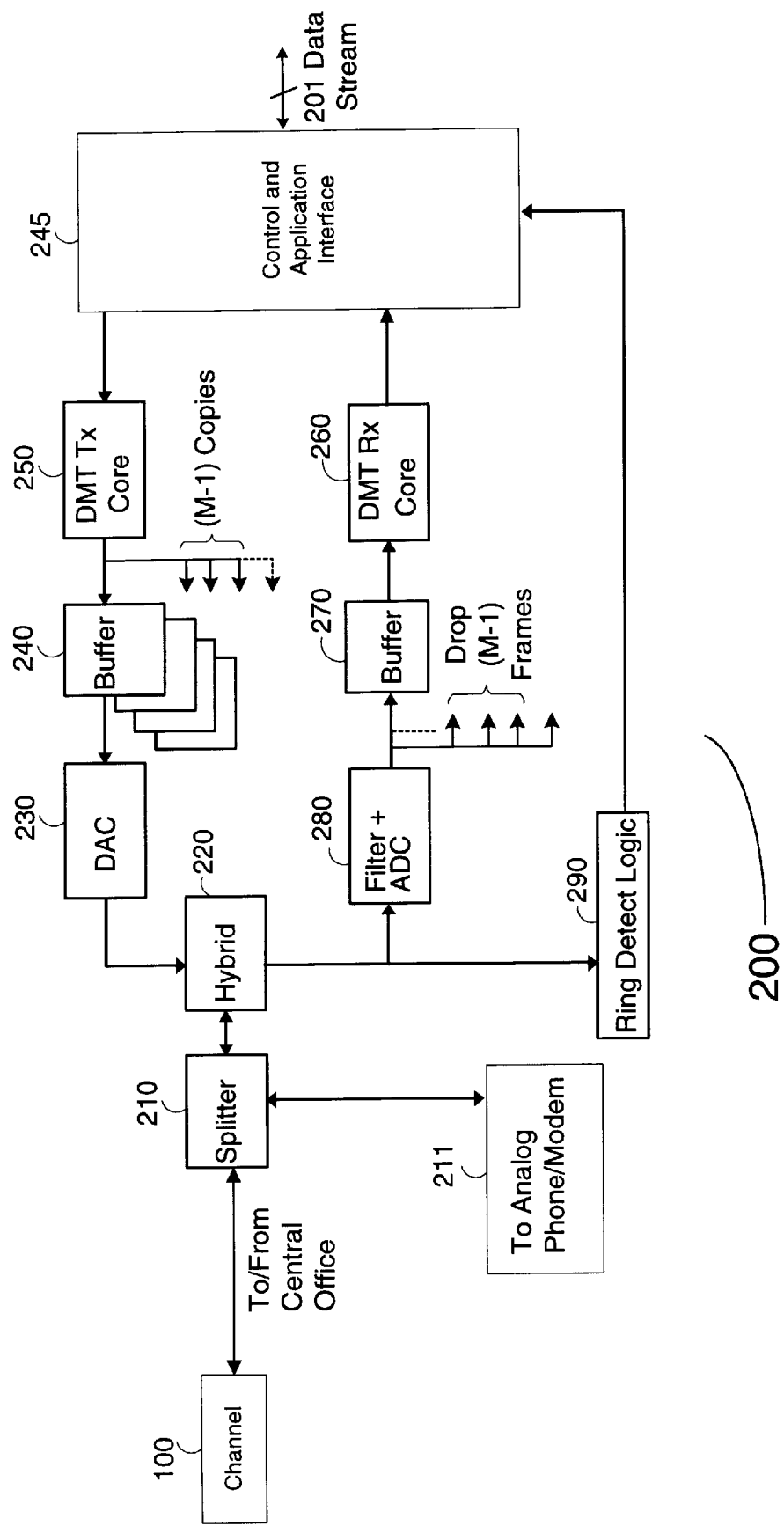
FIG. 2 is a block diagram of a general implementation of a communications system employing the present invention, adapted for use in an ADSL environment.

The basic structure of the present invention is depicted generally in FIG. 2. In general, the present invention can be embodied in different combinations of hardware and software. The primary difference between these embodiments is the specific implementation of the DMT core, and this is discussed in more detail below.

The structure and operation of ADSL transceivers is well-known in the art, and for that reason the present description primarily details those aspects of such transceivers which are necessary to an understanding of the inventions herein. As seen in FIG. 2, a channel 100 is made of a regular copper wire "loop", and each such loop may have differing electrical properties, transmission lengths (sizes), varying attenuation characteristics, and a number of impairments or interferences. Splitter 210, a conventional and well-known circuit, separates a DMT signal occupying more than 200 sub-channels from a lower end 4 kHz POTS analog signal. The latter can be used for simultaneous voice or conventional analog modem transmission. It will be appreciated as well by skilled artisans, however, that the present invention is also completely compatible with so-called "splitterless" ADSL solutions. Hybrid circuit 220 is also well-known in the art, and consists primarily of conventional transformers and isolation circuitry used in a wide variety of high-speed devices interfacing to standard telephone lines. A ring detect logic circuit 290 can also be implemented using accepted techniques, to alert a Control Interface 245 to the existence of a transmission signal originating from an upstream transceiver (not shown).

The full bandwidth signal is bandpass limited to a frequency width B by suitable, well-known techniques as it passes through bandpass Filter and Analog/Digital Converter 280. The received DMT signal is sampled (using any of a number of well-known techniques) and buffered in Buffer 270, which, in a preferred embodiment, is a FIFO. This FIFO is large enough to hold a single block of samples for one DMT symbol. Alternatively, it may be desirable in some contexts for Buffer 270 to include a larger FIFO that is capable of holding more than one DMT sample at a time.

Based on a scaling factor M determined during the handshaking process during the time the xDSL link is established with an upstream transceiver, Buffer 270 stores only one DMT symbol from every set of M symbols received. That is, of the M symbols, M−1 symbols are not stored but simply discarded. This scales down the processing load of Receiver Core 260 by a factor of M.

DMT Receiver Core 260 is responsible for extracting the original data stream from the numerous sub-carriers within any specific received DMT symbol block. Based on a scaling factor M negotiated between transceiver 200 and an upstream transceiver, DMT Receiver Core 260 will only process one out of every M received blocks of DMT symbols. The remaining M−1 frames are ignored or dropped as depicted visually in FIG.2. This aspect of the invention results in the fact that the signal processing capability required is reduced correspondingly by a factor M. In a preferred embodiment, M can be practically varied in integral values from 1 to 10, and is preferably an integer between 1 and 6. The additional M−1 frames can be dropped of course since they are merely duplicates of each other transmitted by the upstream transceiver. In this manner, the effective data rate of the xDSL link is scaled down by a factor M. In the limiting case, M=1, and a full xDSL data rate can be achieved. In other words, a reduced received data rate R(Rx)/M is effectuated where R(Rx) is the nominal maximum downstream data rate available in the particular xDSL protocol being used.

Again in a preferred embodiment, Control Interface 245 receives system configuration information from a host through bus 201. This information may contain such parameters as target throughput rate R, target error rate, etc. By evaluating the signal processing capability of DMT receive core 260, and taking into consideration a requested target data rate R, Control Interface 245 can determine M prior to data transmission. Again, unlike the prior art, the feedback information concerning M is provided by transceiver 200 based primarily on the limiting factor of signal processing capabilities available at transceiver 200 to implement the DMT Rx and Tx data pumps, and not with regard to the transmitting capacity of the upstream transceiver, or the bandwidth of channel 100. This is because, under typical operating conditions, the upstream transceiver and the channel in an xDSL link are expected to have significantly higher data rates.

The DAC 230 and Buffer 240 in the front end transmitting circuit can preferably transmit upstream data using a second frequency bandwidth different from that of the downstream transmission. However, this is not necessary in systems using echo-cancellation. In ADSL applications, the size of this bandwidth is considerably smaller to support a much smaller number of sub-channels. A major modification of this invention to a conventional xDSL transceiver is the fact that Buffer 240 is filled with M' times of the same transmitted DMT symbol. Because of the disparate transmit and receive rates in xDSL systems (such as ADSL), the M and M' values can be different. The scaling factor M' on the transmit side is determined based on the signal processing capability available to process DMT symbols. As such symbols are generated by DMT Tx Core 250, they are stored in Buffer 240 and then converted to analog wave forms by DAC 230. In another preferred embodiment, Buffer 240 only needs to store one DMT block and DAC 230 can be controlled by conventional hardware or software logic to repetitively read Buffer 240 M' times. This scaling reduces the load of DMT Tx core 250 by a factor of M', and reduces the transmit data rate to R(Tx)/M', where R(Tx) is the nominal maximum upstream data rate available in the particular xDSL protocol being used.

In a preferred mode of operation, therefore, scaling factors M and M' are first determined for transceiver 200. Generally speaking, these factors are determined by measuring the time required for the available digital signal processing to process a complete frame, taking into account other typical overhead requirements. This determination procedure can take the form of a self-test or calibration routine that is entirely embedded within a control routine associated with a DSP onboard such transceiver, or, alternatively, in a software modem application, as part of a control routine executed by an off-board processor associated with a user's computing system. It may be desirable, in some contexts to permit a user to configure the specific allocation of transmit and receive data rates through a conventional software program running on such user's personal computer. These routines can be implemented in any number of known ways, and examples are provided in the prior applications noted above. The values for M and M' (which could also include a range of minimum and maximum values for such factors, and/or a relationship between M and M') can be stored onboard transceiver 200 or within an off-board computing system.

When it is desired to establish an xDSL compatible link, standard hand-shaking protocols are utilized such as specified in the T1.413 standard. In addition, however, the upstream transceiver is notified and given information concerning the data rate scaling factors M and M' that transceiver 200 wishes to use for the particular link. Assuming the upstream transceiver contains compatible handshaking processing logic, it can either notify downstream transceiver 200 of the acceptability of such request, or alternatively, in turn request a modification of such factors based on an evaluation of such items as channel characteristics, the target data rates, the processing power available at the upstream transceiver, etc. If the linked transceivers are otherwise able to agree on a set of scaling values M and M', the resulting link is set up to operate in the manner described above.

Some special features of the present invention include the fact that:

(i) unlike hardware architectures implementing a full T1.413 ADSL standard, the present invention loads a DMT block in the receive Buffer 270 every M DMT symbols, where M is agreed to during a handshaking procedure between the upstream and downstream transceivers;

(ii) DMT Rx core 260 is basically implemented the same way as specified by T1.413, but with some important differences, including the fact that it is only necessary to process one of every M DMT symbol blocks within the standard xDSL time period, the speed of FFT implementation can be slower and more cost-effective;

(iii) Control logic 245 permits the system to behave essentially like a conventional analog modem, and is used to support necessary setup tasks such as dialing and handshaking;

(iv) The sampling clock rate, the DMT symbol rate, pilot tones, and upstream and downstream frequency bands remain unchanged from a typical xDSL implementation. The number of samples per symbol, as well as the time duration of a symbol, are also kept the same. These facts make the present invention extremely attractive as a flexible adaptation of xDSL technologies.

(v) The characteristics of a software xDSL transceiver (as discussed in more detail below), including receive and transmit data rates, can be controlled entirely by software updates and modifications to the DMT Tx and Rx routines, rather than by hardware changes.

Other variations which maximize the utility of available signal processing power are apparent. For example, it is conceivable that in some applications it will be desirable to determine a range of values for M and M', and/or to control the relationship between M and M'.

Other variations, which maximize the utility of available signal processing power, are apparent. For example, it is conceivable that in some applications it will be desirable to determine a range of values for M and M' and/or to control the relationship between M and M'. For example, it may be preferable to set M=M' so that the total time spent for each DTM symbol processing is a small fraction of the symbol period. Alternatively, M and M' can be set to maximize either the transmission rate or the receive rate while keeping the total computation time within a small fraction of the overall system load. For example, to maximize the transmission rate, the scaling factor M for the receiver is set to the maximal allowable value and M' for the transmitter is minimized so that the total computation load is within a small fraction of the overall system load. A similar process can be performed when the receive rate needs to maximized. Another possible criterion for setting up the scaling factors is to maintain a certain transmission and receive rate ratio while minimizing the overall load. In this case, the total load $$\mu = \frac{L_{tx}}{M'} + \frac{L_{rx}}{M}$$

is minimized ($L_{tx}$ and $L_{rx}$ are the computation load for the transmitter and receiver, respectively) while the data rate ratio $$\frac{R_{tx}/M'}{R_{rx}/M} = C$$

is maintained at a constant C.

The data transmit and receive rates of the transceiver system therefore could be finely controlled and allocated according to the characteristics, needs or desires of any particular user of such system. Moreover, by providing and storing a range of scaling values for M and M', say 3<M<6, and 4<M'<8, a data link can be flexibly and quickly established without the need for further calibrations or processing power determinations.

While DMT Tx Core 250 and DMT Rx Core 260 are shown coupled closely to the front end stages of transceiver 200, in what may be considered a dedicated hardware implementation, it is apparent that they could also be embodied within a host computing system as part of a "software" modem as explained in more detail below and in the previously filed applications mentioned above. Briefly, however, in a dedicated hardware type implementation DMT sub-channel modulation core is implemented completely in dedicated processing hardware. For this application, DMT Receiver Core 260 typically includes a digital signal processor (DSP) (not shown) and including on-board program ROM (or other suitable memory) for storing executable microcode routines for performing bit, energy and SNR measurements of the carriers in the sub-channels. In such cases system 200 is typically incorporated on a printed circuit board. By mounting or packaging the circuits used in such blocks in an accessible fashion, they can be replaced or supplemented much in the same way present users of personal computers can upgrade their motherboards to include additional microprocessing power or DRAM enhancements. One practical alternative, for example, would be to have an available zero insertion force (ZIF) socket for replacing the DSP or additional available slots to accommodate new DSPs so that a greater number of frames can be processed within a particular time period by DMT Rx Core 260 and DMT Tx Core 250. Other practical and simple variations of this approach will be apparent to those skilled in the art.

In the above dedicated hardware embodiment, the overall speed (data throughput) can be maximized but with less flexibility for upgrades. This is because upgrades to such a system must take the form of hardware replacements, which can be more costly and difficult for the user to incorporate. On the other hand a number of important functions of a communications system can be completely implemented in software, in an analogous fashion to what is commonly described in the art as a "software" modem. In this case, the overall speed of the system depends on the user's processor power available to such user, and only the AFE and Buffer portions of the transceiver need be implemented in hardware. Such software modem implementations could be used in a personal computer system, a hand-held personal digital assistant, a cellular telephone, and similar portable devices having available signal processing capability.

The primary differences between such embodiments are generally: (1) implementation of DMT modulation; (2) implementation of the control and handshaking functions; and (3) implementation of the control interface. An example of both dedicated hardware and software embodiments of an xDSL transceiver is provided in the above-referenced applications, and either of such embodiments could be used effectively with the present invention. Moreover, a more detailed characterization of preferred embodiments of device drivers and user application programs that could control transceiver 200 are also provided in such applications.

Although the present invention has been described in terms of a preferred ADSL embodiment, it will be apparent to those skilled in the art that many alterations and modifications may be made to such embodiments without departing from the teachings of the present invention. For example, it is apparent that the present invention would be beneficial used in any xDSL or high speed multi-carrier application environment Other types of VLSI and ULSI components beyond those illustrated in the foregoing detailed description can be used suitably with the present invention. Accordingly, it is intended that the all such alterations and modifications be included within the scope and spirit of the invention as defined by the following claims.

What is claimed is:

1. A scalable data rate transceiver comprising:
   a channel interface circuit for coupling to and receiving an analog data signal from a data channel; and
   a front end receiving circuit for sampling the analog data signal and generating digital signal blocks based on such analog data signal; and
   a data buffer coupled to the front end receiving circuit which is adapted to be loaded M consecutive times with a selected one of said digital signal blocks, such that said selected one of said digital signal blocks is used during each of the M loadings, where M has a value>=1;
   a signal processing circuit, which circuit is configurable so that it can process one of the M digital signal blocks from the M loadings;
   wherein a data rate R achievable in the data channel is scaled by the value of M resulting in an effective rate R/M achieved by said transceiver.

2. The transceiver of claim 1, wherein the signal processing circuit is configured to transmit the value of M to an upstream transceiver during a data link initialization procedure so that a data link is configurable using the data rate R/M.

3. The transceiver of claim 2, wherein the value of M is adjustable to a value Mn (Mn>M) in response to feedback information from the upstream transceiver so that a data rate R/Mn is achieved.

4. The transceiver of claim 1, wherein data rate R/M is a received data rate used for data received from an upstream transceiver, and a second data rate R'/M' is used for data transmitted from said scalable data rate transceiver to the upstream transceiver, where R' is a maximum available transmission rate, and M' is an integer>=1.

5. The transceiver of claim 4, wherein the received data rate and transmitted data rate are independently controllable by varying such values of M and M'.

6. The transceiver of claim 5, wherein a signal processing circuit computation load $L_{rx}$ is needed for processing a received data symbol, and a signal processing circuit computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

7. The transceiver of claim 1, wherein the value of M is configurable as an integer value including from 1 to 10.

8. A high speed communications data receiver for receiving data from an upstream transceiver that is configured to transmit a data stream up to a data rate R, the receiver comprising:

a channel interface circuit for coupling to and receiving said data stream having said rate R; an analog front end circuit for data sampling analog signals, and generating digitals;

a digital signal storage buffer for storing one of every M generated digital signals such that an effective received data rate R/M is achieved, where M is a data rate scaling factor and has an integer value>=1;

a bus interface circuit for transmitting the stored digital signal to a host processing device, and for receiving a transmission control signal from the host processing device to cause said upstream transceiver to transmit at a data rate substantially equal to said data rate R/M during any data stream transmission;

wherein signal processing requirements of said receiver are reduced because processing is only performed on one of every M digital signals.

9. The receiver of claim 8, wherein the value of M is selected for said receiver based on signal processing capabilities of the host processing device that are available to said receiver.

10. The receiver of claim 9, wherein a calibration routine executed by the host processing device determines the processing capabilities available to the host processing device, as well as said value for said data rate scaling factor M.

11. The receiver of claim 9, wherein the value of M is configurable by a user of the host processing device based on system parameter options presented to the user by an applications program running on the host processing device.

12. The receiver of claim 8, wherein the data receiver is adapted to transmit the value of M to an upstream transceiver during a data link initialization procedure so that a data link can be established using the data rate R/M.

13. The receiver of claim 8, wherein data rate R/M is a received data rate used for data received from an upstream transceiver, and a second data rate R'/M' is used for data transmitted from said scalable data rate receiver to the upstream transceiver, where R' is a maximum available transmission rate, and where M' is an integer>=1.

14. The receiver of claim 13, wherein the received data rate and transmitted data rate are independently controlled by varying such values of M and M'.

15. The receiver of claim 14, wherein a host processing device computation load $L_{rx}$ is needed for processing a received data symbol, and a host processing device computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

16. The receiver of claim 8, wherein M is configurable as an integer value including from 1 to 10.

17. A high speed communications system comprising:

a channel interface circuit for coupling to and receiving an analog data signal from a channel; and a front end receiving circuit for processing said analog data signal and converting it to a digital signal; and a digital signal storage buffer for receiving M substantially identical copies of such digital signal, where M is a data rate scaling factor and has an integer value>=1;

a bus interface circuit for transmitting the stored digital signal to a host processing device, and for receiving a transmission control signal from the host processing device to cause a remote transmitter to transmit at a data rate substantially equal to a data rate R/M during any data stream transmission, where R represents a data rate used by said remote transmitter;

wherein the value of M is based on computing capabilities of the host processing device.

18. The system of claim 17, wherein the value of M is selected for said system based on signal processing capabilities of the host processing device that are available to said system.

19. The system of claim 17, wherein a calibration routine executed by the host processing device determines the processing capabilities available to the host processor circuit, as well as said value for said data rate scaling factor M.

20. The system of claim 17, wherein the value of M is configurable by a user of the host processing device based on system parameter options presented to the user by an applications program running on the host processing device.

21. The system of claim 17, wherein the system is adapted to transmit the value of M to said remote transmitter during a data link initialization procedure so that a data link is configurable using the data rate R/M.

22. The system of claim 17, wherein data rate R/M is a received data rate used for data received from an upstream transceiver, and a second data rate R'/M' is used for data transmitted from said system to said remote transmitter, where R' is a maximum available transmission rate, and where M' is an integer>=1.

23. The system of claim 17, wherein the received data rate and transmitted data rate are independently controlled by varying such values of M and M'.

24. The system of claim 22, wherein a host processing device computation load $L_{rx}$ is needed for processing a received data symbol and a host processing device computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

25. The system of claim 17, wherein M is configurable as an integer value including from 1 to 10.

26. A data rate scalable xDSL software transceiver comprising:

a channel interface circuit for coupling to and receiving an analog data signal from a digital subscriber loop data channel; and a front end receiving circuit for sampling the analog data signal and generating a digital DMT symbol based on such analog data signal; and a data buffer coupled to the front end receiving circuit which from every set of M consecutive DMT symbols generated by the front end circuit generates a single DMT symbol; and a bus interface circuit for transmitting the stored DMT symbol to a host processing device, and for receiving a transmission control signal from the host processing device to cause a remote transceiver to transmit at a data rate substantially equal to a data rate R/M during any data stream transmission, where R is a maximum data rate for said remote transceiver;

wherein a value for M is adjustable by said transceiver based on characteristics of the host processing device, and said data rate of said transceiver is controllable based on the value for M.

27. The transceiver of claim 26, wherein the value of M is selected based on signal processing capabilities of the host processing device.

28. The transceiver of claim 26, wherein the value of M is configurable by a calibration routine executed by the host processing device to determine the processing capabilities available to the host processing device.

29. The transceiver of claim 26, wherein the value of M is configurable by a user of the host processing device based on system parameter options presented to the user by an applications program running on the host processing device.

30. The transceiver of claim 26 wherein data rate R/M is a received data rate used for data received from said remote transceiver, and a second data rate R'/M' is used for data transmitted from said scalable data rate transceiver to the remote transceiver, where R' is a maximum available transmission rate and where M' is an integer>=1.

31. The transceiver of claim 30, wherein the received data rate and transmitted data rate are independently controlled by varying such values of M and M'.

32. The transceiver of claim 31, wherein a signal processing circuit computation load $L_{rx}$ is needed for processing a received data symbol, and a signal processing circuit computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

33. The transceiver of claim 26, wherein M is configurable as an integer value including from 1 to 10.

34. A data rate scalable xDSL transceiver comprising:
a channel interface circuit for coupling to and receiving an analog data signal from a digital subscriber loop data channel; and
a front end receiving circuit for sampling the analog data signal and generating a digital DMT symbol based on such analog data signal; and
a data buffer coupled to the front end receiving circuit which from every set of M consecutive DMT symbols generated by the front end circuit generates a single DMT symbol; and
a signal processing circuit for processing the single DMT symbol;
wherein a value for M is configurable based on characteristics of the signal processing circuit, and a data rate R/M of the data rate scalable transceiver is controllable based on the value for M, where R is a data rate used by a remote transceiver and
further wherein the data rate scalable xDSL transceiver is configured to transmit the value of M to said remote transceiver during a data link initialization procedure.

35. The transceiver of claim 34 wherein M is configurable as an integer value including from 1 to 10.

36. The transceiver of claim 35, wherein the value of M is selected for said transceiver based on signal processing capabilities of the signal processing circuit.

37. A data rate scalable xDSL transceiver comprising:
a channel interface circuit for coupling to and receiving an analog data signal from a digital subscriber loop data channel; and
a front end receiving circuit for sampling the analog data signal and generating a digital DMT symbol based on such analog data signal; and
a data buffer coupled to the front end receiving circuit which from every set of M consecutive DMT symbols generated by the front end circuit generates a single DMT symbol; and
a signal processing circuit for processing the single DMT symbol;
wherein a value for M is configurable based on characteristics of the signal processing circuit, and a data rate of the transceiver is controllable based on the value for M; and
further wherein a received data rate R/M is used for data received from a remote transceiver, where R is a maximum transmit data rate for said remote transceiver, and a second data rate R'/M' is used for data transmitted from the data rate scalable xDSL transceiver to said remote transceiver, where R' is a maximum available transmission rate for the data rate scalable xDSL transceiver, and where M' is an integer>=1.

38. A data rate scalable xDSL transceiver comprising:
a channel interface circuit for coupling to and receiving an analog data signal from a digital subscriber loop data channel; and
a front end receiving circuit for sampling the analog data signal and generating a digital DMT symbol based on such analog data signal; and
a data buffer coupled to the front end receiving circuit which from every set of M consecutive DMT symbols generated by the front end circuit generates a single DMT symbol; and
a signal processing circuit for processing the single DMT symbol;
wherein a value for M is configurable based on characteristics of the signal processing circuit, and a data rate of the transceiver is controllable based on the value for M; and
further wherein a received data rate R/M is used for data received from a remote transceiver, where R is a maximum transmit data rate for said remote transceiver, and a second data rate R'/M' is used for data transmitted from the data rate scalable xDSL transceiver to said remote transceiver, where R' is a maximum available transmission rate for the data rate scalable xDSL transceiver and where M' is an integer>=1:
whereby the received data rate and transmitted data rate are independently controlled by varying such values of M and M'.

39. A data rate scalable xDSL transceiver comprising:
a channel interface circuit for coupling to and receiving an analog data signal from a digital subscriber loop data channel; and
a front end receiving circuit for sampling the analog data signal and generating a digital DMT symbol based on such analog data signal; and
a data buffer coupled to the front end receiving circuit which from every set of M consecutive DMT symbols generated by the front end circuit generates a single DMT symbol; and
a signal processing circuit for processing the single DMT symbol;
wherein a value for M is configurable based on characteristics of the signal processing circuit, and a data rate of the transceiver is controllable based on the value for M; and
further wherein a received data rate R/M is used for data received from a remote transceiver, where R is a maximum transmit data rate for said remote transceiver, and a second data rate R'/M' is used for data transmitted from the data rate scalable xDSL transceiver to said remote transceiver, where R' is a maximum available transmission rate for the data rate scalable xDSL transceiver, and where M' is an integer>=1, such that the received data rate and transmitted data rates are independently controlled by varying such values of M and M; and further wherein when a computation load $L_{rx}$ is needed for processing a received symbol, and a computation load $L_{tx}$ is needed for processing a transmitted symbol, a data rate ratio (R/M)/(R'/M') is maintained substantially constant while a data load $$\mu = \frac{L_{tx}}{M'} + \frac{L_{rx}}{M}$$

is minimized.

40. A data rate scalable transceiver configured to be used in a digital subscriber loop supporting a downstream data transmission rate R and an upstream data transmission rate R', said transceiver comprising:

an interface circuit for coupling to and receiving an analog data signal from said digital subscriber loop; and a front end receiving circuit for sampling the analog data signal and generating a received digital DMT symbol based on such analog data signal; and a receive data buffer coupled to the front end receiving circuit which from every set of M consecutive DMT symbols generated by the front end circuit generates a single DMT symbol, where M has an integer value>=1; and a signal processing circuit for processing the single received DMT symbol, and for generating a sequence of M' identical DMT symbols containing data to be transmitted by said transceiver, where M' has an integer value>=1; and a transmit data buffer for storing the M' identical DMT symbols from the signal processing circuit; and a front end transmitting circuit for generating an analog transmission data signal based on the M' DMT symbols; and wherein said downstream data transmission rate R is scaled to a rate R/M, and said upstream data transmission rate R' is scaled to a rate R'/M'.

41. The transceiver of claim 40, wherein the values of M and M' are selected for said transceiver based on signal processing capabilities of the signal processing circuit.

42. The transceiver of claim 40, wherein the transceiver is configured to transmit the values of M and M' to an upstream transceiver during a data link initialization procedure so that a data link is configurable using the downstream data transmission rate R/M and upstream data transmission rate R'/M'.

43. The transceiver of claim 40, wherein a computation load $L_{rx}$ is needed for processing a received data symbol and a computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

44. The transceiver of claim 40, wherein M and M' have variable integer values including from 1 to 10.

45. A method of implementing a scalable data rate transceiver comprising the steps of:

receiving an analog data signal from a data channel; and sampling the analog data signal and generating a digital signal based on such analog data signal; and receiving M substantially identical copies of such digital signal, where M is configured to have a value>=1;

processing one of the M copies of the digital signals;

wherein a data rate R achievable in the data channel is scalable by the value of M resulting in an effective rate R/M achieved by said transceiver.

46. The method of claim 45, wherein the value of M is based on computing capabilities of a signal processing circuit used for processing the digital signals.

47. The method of claim 45, further including a step transmitting the value of M to an upstream transceiver during a data link initialization procedure so that a data link is established using the data rate R/M.

48. The method of claim 45, further including a step of adjusting M to have a value Mn (Mn>M) in response to feedback information from an upstream transceiver so that a data rate R/Mn is achieved.

49. The method of claim 45, wherein data rate R/M is a received data rate used for data received from an upstream transceiver, and a second data rate R'/M' is used for data transmitted from said data rate transceiver to the upstream transceiver, where R' is a maximum available transmission rate, and where M' is an integer>=1.

50. The method of claim 49, wherein the received data rate and transmitted data rate are independently controlled by varying such values of M and M'.

51. The method of claim 50, wherein a computation load $L_{rx}$ is needed for processing a received data symbol, and a computation load $L_{tx}$ is needed for processing a transmitted data symbol; and wherein a data rate ratio (R/M)/(R'/M') is maintained substantially constant while a data load $$\mu = \frac{L_{tx}}{M'} + \frac{L_{rx}}{M}$$

is minimized.

52. The method of claim 45, wherein M is configurable as an integer value including from 1 to 10.

53. The method of claim 45, further including a step wherein an ADSL compatible data link is set up by said transceiver in said channel.

54. A method for communicating data to a host processing device from an upstream transceiver transmitting an analog data transmission signal using a nominal data rate R in a channel coupled to the host processing device, said method comprising the steps of:

receiving said analog data transmission signal from the channel; and processing the analog data transmission signal and generating a corresponding digital signal; and storing one of every M generated digital signals generated during step (b) such that an effective received data rate R/M is achieved with the upstream transceiver, where M is a data rate scaling factor and has an integer value>=1;

processing said one of every M digital signals; and generating feedback information indicating to the upstream transceiver that a data rate of R/M should be used in said channel even when said channel can support said data rate R.

55. The method of claim 54, wherein the value of M is based on computing capabilities of a signal processing circuit used for processing said one of every M digital signals.

56. The method of claim 54, wherein data rate R/M is a received data rate used for data received from the upstream transceiver, and a second data rate R/M' is used for data transmitted to the upstream transceiver, where R' is a maximum available transmission rate, and where M' is an integer>=1.

57. The method of claim 56, wherein the received data rate and transmitted data rate are independently controlled by varying such values of M and M'.

58. The method of claim 54, wherein M and M' are configurable as integer values including from 1 to 10.

59. The method of claim 54, further including a step wherein an ADSL compatible data link is set up by said transceiver in said channel.

60. A method of operating a high speed communications system that is coupled through a channel to a host processing device and an upstream transceiver supporting an analog data transmission signal having a data rate R, said method comprising:

(a) configuring said system to achieve a receive data rate R/M, where M is a data rate scaling factor and has an integer value>=1; and (b) receiving an analog initialization signal at said rate R from the upstream transceiver through the channel; and (c) generating feedback information indicating to the upstream transceiver that a data rate of R/M should be used for data transmission; and (d) receiving an analog data transmission signal at an effective data rate R/M from the upstream transceiver; and (e) generating a digital signal based on sampling the analog data transmission signal; and (f) transmitting the digital signal to said host processing device so that it is processed to extract selected data from the data carrying signals.

61. The method of 60 further including a step: determining an optimal value for M based on processing capabilities of said host processing device.

62. The method of claim 60, further including a step wherein protocol information pertaining to standards applicable to Asymmetric Digital Subscriber Loops is transmitted by the upstream data transceiver so as to set up an ADSL compatible data link.

63. The method of claim 61, wherein data rate R/M is a received data rate used for data received from the upstream transceiver, and a second data rate R/M' is used for data transmitted to the upstream transceiver, where R' is a maximum available transmission rate, and where M' is an integer>=1.

64. The method of claim 63, wherein the received data rate and transmitted data rates are independently controlled by varying such values of M and M'.

65. The method of claim 64, wherein M and M' are configurable as integer values including from 1 to 10.

* * * * *